United States Patent [19]

Stancliffe

[11] 4,046,339
[45] Sept. 6, 1977

[54] LANDING GEAR FOR AN AIRCRAFT INCLUDING EXPANSIBLE WHEELS

[76] Inventor: Floyd S. Stancliffe, 5584 Sunny Oaks, San Jose, Calif. 95123

[21] Appl. No.: 683,270

[22] Filed: May 5, 1976

[51] Int. Cl.² .................................... B64C 25/36
[52] U.S. Cl. ............................ 244/103 R; 301/16
[58] Field of Search ............ 244/100 R, 101, 102 R, 244/103 R; 115/1 R, 1 A; 301/5 R, 41, 43, 16; 305/19

[56] References Cited

U.S. PATENT DOCUMENTS

| | | | |
|---|---|---|---|
| 1,450,484 | 4/1923 | Childs | 301/43 |
| 1,601,337 | 9/1926 | Avery | 244/103 R |
| 3,802,743 | 4/1974 | Hermanns | 301/5 R |

*Primary Examiner*—Trygve M. Blix
*Assistant Examiner*—Barry L. Kelmachter
*Attorney, Agent, or Firm*—Paul B. Fihe

[57] ABSTRACT

An auxiliary landing gear for an aircraft including a pair of auxiliary wheels mounted from the wings and including an exterior rim composed of segments connected to a hub by expansible members whereby expansion from a collapsed inoperative disposition to an expanded operative disposition to facilitate landing on rough terrain is achieved.

3 Claims, 5 Drawing Figures

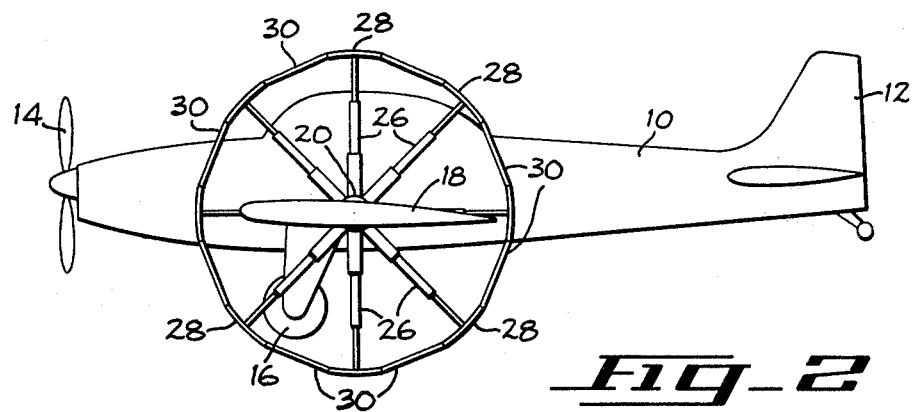
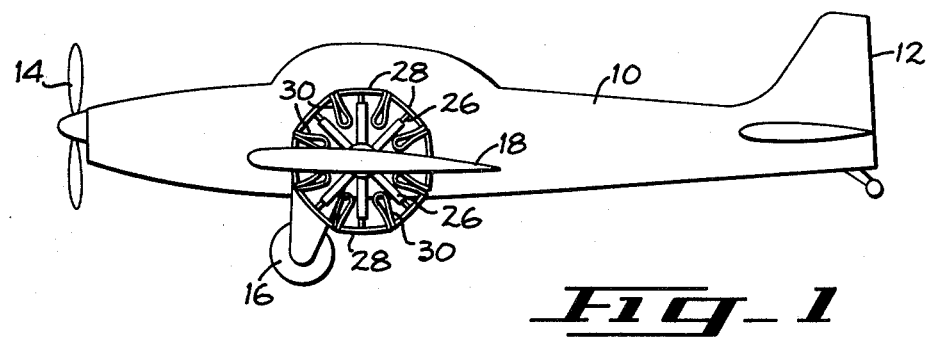
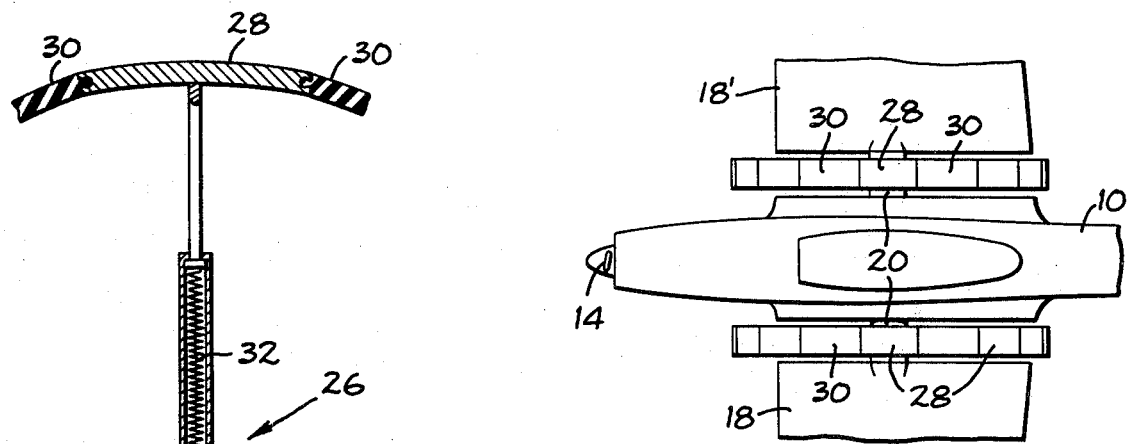
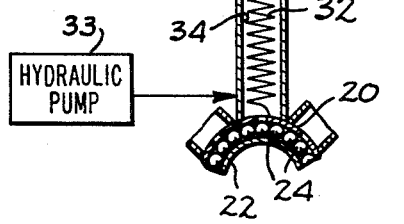
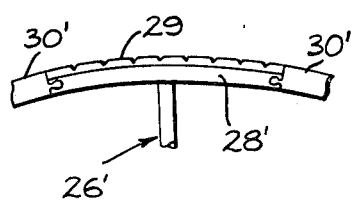

LANDING GEAR FOR AN AIRCRAFT INCLUDING EXPANSIBLE WHEELS

The present invention generally relates to landing gear for aircraft and, more particularly, to an auxiliary landing gear that can be brought into operation to facilitate safe landings on rough terrain.

BACKGROUND OF THE INVENTION

Conventional landing gear, whether fixed or retractable into the fuselage of an aircraft, normally includes landing wheels of relatively small diameter which are perfectly capable of providing safe take-offs and landing on smooth run ways at airports but which present an unsafe condition when a forced landing on rough terrain, such as a plowed field, is attempted. More particularly, the small wheels are essentially caught in the rough terrain so that the plane then flips over forwardly resulting in damage, not only to the aircraft, itself, but to its occupants.

SUMMARY OF THE INVENTION

Accordingly, it is an object of the present invention to provide an auxiliary landing gear specifically for use in forced landings including a pair of wheels of rather large diameter when placed in their operative dispositions for purposes of landing on rough terrain but which can be withdrawn to collapsed inoperative disposition whereat their total volume is minimized and the general aerodynamic characteristics of the aircraft in flight are not deleteriously effected.

Generally, such objective can be achieved by a pair of wheels which are mounted on opposite sides of the fuselage and preferably on the wing structure of the aircraft on suitable bearings to provide for rotation thereof. Each wheel has a number of spokes having a plurality of telescopic sections, the outermost of which mounts a rim section. Adjacent rim sections are joined by flexible elements of rubber or plastic resilient material which joins the extremities of the rim sections when the telescopic spokes have been expanded outwardly to form substantially a circular outline. When so expanded, the structure extends downwardly below the existent conventional landing gear so as to provide a substitute therefor during an emergency landing operation on rough terrain.

BRIEF DESCRIPTION OF THE DRAWING

Details of the invention will be more readily understood by reference to the following detailed description of the exemplary structure shown in the accompanying drawing wherein:

FIG. 1 is a side elevational view of an aircraft including an auxiliary landing gear embodying the present invention in its collapsed inoperative disposition, FIG. 2 is a side elevational view similar to FIG. 1 of an aircraft but illustrating the auxiliary landing gear of the present invention in its expanded operative disposition, FIG. 3 is a fragmentary top plan view of the FIG. 2 structure, FIG. 4 is a greatly enlarged fragmentary sectional view of a portion of the auxiliary landing gear to illustrate interior details of its structural arrangement, and FIG. 5 is a fragmentary view of a modified form of landing gear.

DETAILED DESCRIPTION OF THE EXEMPLARY EMBODIMENT OF THE INVENTION

With initial reference to FIG. 1, there is somewhat diagrammatically illustrated a relatively small aircraft including an elongated fuselage 10 having a tail portion 12 at its rearmost end, a propeller 14 at its forward extremity and a pair of conventional landing wheels 16 fixed to the undersurface of its fuselage at an intermediate position.

The illustrated aircraft is of the low-wing variety, such wings 18, 18' projecting outwardly from opposite sides of the fuselage 10 substantially above the described conventional landing gear 16. The wings 18, 18' are somewhat modified, as is best shown in FIG. 3, to provide adjacent the fuselage, on each side thereof, an interrupted wing section which basically constitutes a hollow cylindrical hub 20, 20' through which control linkages of conventional variety can pass for connection to wing flaps and other control elements (not shown). Details of this structural arrangement are indeed conventional and, thus, will not be shown nor described in further detail.

Adjacent the exterior of each hub 20, an annular chamber 22 is formed, as best shown in FIG. 4, to house suitable bearings 24 for the rotary support of the hub exterior. A plurality of telescoping spokes 26 are secured to the exterior of the hub 20 at equal angular intervals to project radially outward therefrom, the largest telescopic section being attached directly to the hub 20 and the additional three sections of the telescopic spokes being of successively smaller diameters wherefore each section is capable of telescopic withdrawal into its larger neighbor, so that the entire length of the spoke 26 is relatively small when the sections are fully retracted.

At the outermost end of the outermost telescopic section of the spoke 26, an arcuate rigid rim section 28 is mounted, the curvature of such rim section corresponding to that of the circumference of a circle defined by the sequence of such rim sections 28 when the telescopic spokes 26 are in fully expanded dispositions, as shown best in FIG. 2.

The arcuate extremity of each rim section 28 is firmly fixed to a flexible strap 30 of rubber, plastic or other resilient material and the opposite extremity of this resilient strap is, in turn, secured to the arcuately adjacent rim section when the telescopic spokes 26 are expanded to their fullest extent. As show in FIG. 2, these resilient straps 30 form substantially an arcuate intermediary between the rim sections 28 so that a relatively circular wheel surface is formed by the conjoined structures when in their expanded disposition, as shown in FIGS. 2 and 3. On the other hand, when the telescopic spokes 26 are retracted, the adjoining resilient straps 30 fall into flexed dispositions and the extremities of the rigid rim sections 28 comes into closely adjacent dispositions, as can be seen best by reference to FIG. 1.

The telescopic spokes 26 can be moved to and from their expanded or retracted dispositions by any suitable means and, as shown, each section preferably includes a coil spring 32 which is attached at one end to its surrounding telescopic section and at its opposite end to the extremity of the adjacent section so that when the telescopic sections are placed in their expanded positions, the spring tension urges each of the sections toward its collapsed disposition. In order to expand the telescopic spokes 26 into their extended dispositions, hydraulic fluid from a suitable source such as a hydraulic pump diagrammatically indicated at 33 can be supplied through the described annular chamber 22 and thence through successive openings 34 between the telescopic sections so as to exert pressure thereon in opposition to the spring tension wherefore the telescopic sections are moved outwardly to the operative disposition, shown in FIGS. 2, 3, and 4. It is to be expressly noted, as shown in FIG. 2, that the wheels, when expanded, extend below the conventional landing gear on the aircraft.

Certain detailed changes can be made in the landing gear shown in FIGS. 1-4, one example being shown in FIG. 5. As illustrated, a modified rim section 28' incorporates a central raised and serrated edge 29 which serves a dual function. During landing in soft earth, it prevents side slipping of the landing gear. Secondly, if a barbed-wire fence is encountered, the fence wire will be severed to allow an uninterrupted continuance of the landing operation.

It will be apparent that the precise spoke expansion mechanism described can be modified from that specifically described and also that the auxiliary landing gear can be mounted at other positions on the aircraft, depending upon its particular design, for example, at the side of the fuselage rather than directly on the wings as specifically described hereinabove. Yet other modifications and/or alternations can be visualized without departing from the spirit of the invention, and the foregoing description of one embodiment is therefore to be considered purely as exemplary and not in a limiting sense. The actual scope of the invention is to be ascertained only by reference to the appended claims.

What is claimed is:

1. Aircraft landing gear for an aircraft having a fuselage and attached wing which comprises
   a pair of wheels mounted for rotation on opposite sides of the aircraft fuselage,
   each of said wheels being expansible from a relatively small diameter to an expanded diameter whereat the lower most peripheral edge of each wheel is below the aircraft in its normal landing disposition,
   each of said wheels including a plurality of telescopic spokes,
   each spoke mounting a curved rim section at its outermost extremity and including a resilient strap joining the extremities of adjacent rim sections.

2. Aircraft landing gear according to claim 1 which comprises
   means normally urging each of said telescopic spokes to its retracted position.

3. Aircraft landing gear according to claim 2 which comprises
   hydraulic means operable to move each of said telescopic spokes to its extended disposition.

* * * * *